United States Patent

[11] 3,573,501

[72] Inventor Max H. Diehl
Manlius, N.Y.
[21] Appl. No. 723,024
[22] Filed Apr. 22, 1968
[45] Patented Apr. 6, 1971
[73] Assignee General Electric Company

[54] SOLID STATE SWITCHING CIRCUITS
6 Claims, 4 Drawing Figs.

[52] U.S. Cl. .......... 307/257, 307/321
[51] Int. Cl. .......... H03b 17/00
[50] Field of Search .......... 307/254, 256, 257, 321; 328/99, 208; 323/75 (E)

[56] References Cited
UNITED STATES PATENTS

| | | | |
|---|---|---|---|
| 3,179,817 | 4/1965 | Bounsall | 307/254 |
| 3,183,373 | 5/1965 | Sakurai | 307/256 |
| 3,449,596 | 6/1969 | Milberger et al. | 307/257 |
| 3,127,564 | 3/1964 | Giger | 307/257X |

*Primary Examiner*—Donald D. Forrer
*Assistant Examiner*—B. P. Davis
*Attorneys*—W. J. Shanley, Jr., Thomas A. Briody, Marvin Snyder, Oscar B. Waddell and Frank L. Neuhauser

ABSTRACT: A solid state switching circuit including a diode bridge network is operated by DC control currents. One pair of opposite points of the bridge network is connected in the line to be switched. The other pair of opposite points of the bridge network is connected to a control circuit which produces conduction or nonconduction simultaneously in the diodes. Unidirectional currents from the control circuit, flowing in the bridge circuit, flow in opposite directions in both the input and output circuit of the line to be switched and are balanced out.

INVENTOR:
MAX H. DIEHL,

BY Julius J. Zaskalicky
HIS ATTORNEY.

SOLID STATE SWITCHING CIRCUITS

BACKGROUND OF THE INVENTION

Solid state switching circuits are used in a number of applications; for example, for cross point switching of any of a plurality of video source busses to any of utilization busses. In certain applications solid state switching circuits have replaced mechanical switches which, in general, are bulky, costly, lack sufficient reliability, and have contacts which are subject to contamination. Even though such solid state switching circuits have overcome certain shortcomings of mechanical switches, they also have had some shortcomings, such as lack of sufficient isolation between the input and output terminals thereof and also the appearance of control currents at the input and output terminals of the switch circuits when such circuits are actuated by control currents.

The present invention is directed to overcoming such disadvantages in the prior art solid state switches.

SUMMARY OF INVENTION

In accordance with an illustrative embodiment of the present invention there is provided a bridge network of two pairs of diodes, each pair of diodes connected in series between an input and an output terminal. One pair of diodes has cathodes connected in common and the other pair of diodes has anodes connected in common. A pair of biasing networks is provided across a source of voltage, each having a point thereof connected to a respective common electrode point of the pairs of diodes. The value of an impedance in each of the networks is dynamically changed to change the biasing of the diodes and hence the impedance the diodes present between input and output terminals. The circuit enables high isolation and low insertion loss to be achieved and is so constituted that diode control currents are balanced out in the input and the output of the circuit.

The novel features believed characteristic of the invention are set forth in the appended claims. The invention itself, together with further advantages thereof may best be understood by reference to the following description taken in connection with the accompanying drawings in which:

Figure 1:
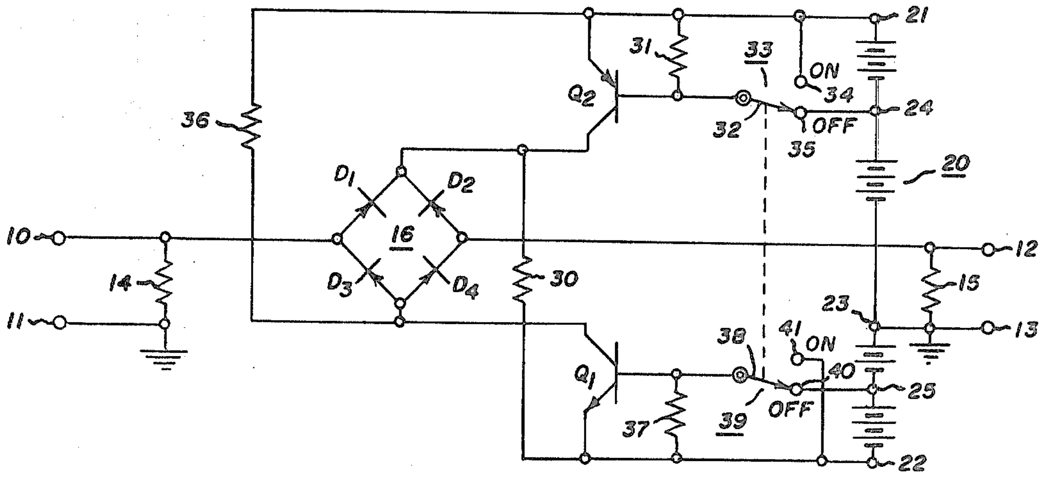
FIG. 1 is a schematic diagram of one embodiment of the switching circuit of my invention.

Referring now to FIG. 1, there is shown an illustrative embodiment of the switching system of the present invention. In this figure is shown a pair of input terminals 10 and 11 and a pair of output terminals 12 and 13. Input terminal 11 and output terminal 13 are connected to ground. A load resistance 14 is provided across the input terminals and another load resistance 15 is provided across the output terminals. A bridge circuit 16 including four diodes $D_1$, $D_2$, $D_3$, and $D_4$ is connected between the input terminal 10 and output terminal 12. Diodes or unilaterally conducting devices $D_1$ and $D_2$ are connected in series circuit with their cathodes in common between the input terminal 10 and the output terminal 12. Diodes $D_3$ and $D_4$ are connected in series circuit with their anodes in common between the input terminal 10 and the output terminal 12.

Control voltages for controlling the conduction of the diodes $D_1$, $D_2$, $D_3$, and $D_4$ are provided by circuits associated with NPN transistor $Q_1$ and PNP transistor $Q_2$. Energization for the transistors $Q_1$ and $Q_2$ and their control circuits is provided by a source of unidirectional potential 20 having a positive terminal 21, a negative terminal 22, and a terminal 23 connected to ground at an intermediate potential point. In addition, there is provided on the source 20 a potential point 24 intermediate the positive potential point 21 and the intermediate point 23, and another potential point 25 intermediate in potential between the negative potential point 22 and the intermediate potential point 23.

The cathodes of $D_1$ and $D_2$ are connected through a biasing or load resistor 30 to the negative potential point 22 and also to the collector of PNP transistor $Q_2$. The emitter of transistor $Q_2$ is connected to the positive point 21. The base of transistor $Q_2$ is connected through a resistance 31 to the positive potential point 21 and also to the pole 32 of a single-pole double-throw switch 33, one contact 34 of which is connected to the positive potential point 21 and the other contact 35 of which is connected to the potential point 24.

The anodes of diodes $D_3$ and $D_4$ are connected through a biasing or or load resistor 36 to the positive potential point 21 and also to the collector of NPN transistor $Q_1$. The emitter of transistor $Q_1$ is connected to the negative potential point 22. The base of transistor $Q_1$ is connected through a load resistance 37 to the negative point 22 and also to the pole 38 of a single-pole double-throw switch 39, one contact 41 of which is connected to the negative potential point 22 and the other contact 40 of which is connected to the negative potential point 25. The contacts 35 and 40 are referred to as "OFF" contacts and the contacts 34 and 41 are referred to as the "ON" contacts. The poles 32 and 38 of the switches are ganged together.

When the poles of the switches 33 and 39 are in the "ON" position, control voltages are provided to the bridge circuit 16, thereby rendering all of the diodes $D_1$, $D_2$, $D_3$, and $D_4$ conductive to provide a low impedance path from input terminal 10 to output terminal 12. When the poles of the switches are contacting the "OFF" contacts thereof, control voltages are provided to the bridge circuit 16 which biases the diodes $D_1$, $D_2$, $D_3$, and $D_4$ nonconductive, thereby providing isolation of input terminal 10 from output terminal 12.

When switch 33 and switch 39 are in the "OFF" position, the emitter-base circuit of transistor $Q_1$ is biased conductive and similarly the emitter-base circuit of transistor $Q_2$ is biased conductive. Accordingly, as the saturation resistances of transistors $Q_1$ and $Q_2$ are quite low in relation to the size of resistances 36 and 30, the anodes of diodes $D_3$ and $D_4$ are biased negatively through the collector-to-base circuit of transistor $Q_1$ from negative potential point 22 and the cathodes of diodes $D_1$ and $D_2$ are biased positively through the collector-to-base circuit of transistor $Q_2$ from positive potential point 21. Thus, each of diodes $D_1$, $D_2$, $D_3$ and $D_4$ are reversely biased in respect to the intermediate potential point 23. Consequently, a high impedance is provided between the input terminal 10 and the output terminal 12.

Figure 2:
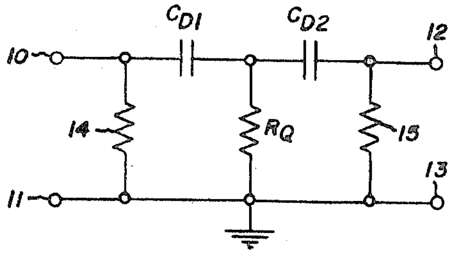
FIG. 2 is an equivalent circuit of one-half of the diode bridge circuit of FIG. 1 useful in explaining the operation thereof.

FIG. 2 is an equivalent circuit of a portion of the schematic circuit of FIG. 1 showing the impedance presented between the input terminal 10 and the output terminal 12 when the diodes $D_1$ and $D_2$ are reversely biased. Elements of FIG. 2 identical with elements of FIG. 1 are designated by the same reference symbol. The $C_{D1}$ represents the capacitance of the reversely biased diode $D_1$ and the $C_{D2}$ represents the capacitance of the reversely biased diode $D_2$. $R_Q$ represents the saturation resistance of the transistor $Q_2$. Accordingly, it is seen that when the diodes $D_1$ and $D_2$ are reversely biased, the signal appearing across resistor 14 is lowered due to the shunt circuit presented by the series impedance of $C_{D1}$ and $R_Q$. As the capacitive reactance of the small capacitance $C_{D1}$ is large in relation to the saturation resistance $R_Q$, only a very small portion of the signal appearing across resistor 14 appears across $R_Q$. Similarly, the small signal appearing across $R_Q$, is further lowered due to the shunt circuit presented by the series impedance of $C_{D2}$ and resistance 15. Conventional diode elements available for use in the bridge network have parameters which enable a high degree of isolation to be achieved between input terminal 10 and output terminal 12. An equivalent circuit could be drawn for the diodes $D_3$ and $D_4$ similar to the equivalent circuit including diodes $D_1$ and $D_2$.

When the switches 33 and 39 are in the "ON" position the base of transistor $Q_1$ is connected to the negative potential point 22 and the base of transistor $Q_2$ is connected to the positive potential point 21. Such potentials applied to the transistors $Q_1$ and $Q_2$ render the transistors nonconductive, that is, conduction through the transistors is blocked. Accordingly, the cathodes of diodes $D_1$ and $D_2$ are connected through load resistor 30 to the negative potential point 22 and the anodes of diodes $D_3$ and $D_4$ are connected through load resistor 36 to the positive potential point 21, thereby biasing diodes $D_1$, $D_2$, $D_3$ and $D_4$ into conduction. Current flows from the positive terminal 21 branching through diodes $D_3$ and $D_4$ into input resistance 14 and output resistance 15 to ground. Also, currents flow in the opposite direction from the terminals 11 and 13 through the resistors 14 and 15, diodes $D_1$ and $D_2$, and resistor 30 to the negative potential point 22. The impedances of the branch circuits described, in which unidirectional currents flow from the positive point 21 through resistance 36, the diodes $D_3$ and $D_4$, and resistances 14 and 15 to ground, and from ground through resistances 14 and 15, diodes $D_1$, and $D_2$, and resistance 30 to a negative potential point 22, are proportioned such that the current flow in the input resistance 14 and in the output resistance 15, resulting from the combined currents, is balanced out. Such an arrangement eliminates control currents from the circuits being switched. The circuit shown in FIG. 1 would be suitable in switching systems in which large numbers of sources of signals are arranged to be connected simultaneously to a large number of outputs; for example, in video switching networks. Note that in the circuit shown in FIG. 1, to produce the nonconductive condition in the diodes of the bridge network, transistors $Q_1$ and $Q_2$ have to be rendered conductive. A large number of units of a kind set forth in FIG. 1 would be used and would connect the cross points of the input and output lines of the system. Often, only a few of the input lines would be connected to a few of the output lines. Under such circumstances, it would be desirable that the transistors in the control portion of the switch associated with the diodes which are nonconducting, also be nonconductive.

Figure 3:
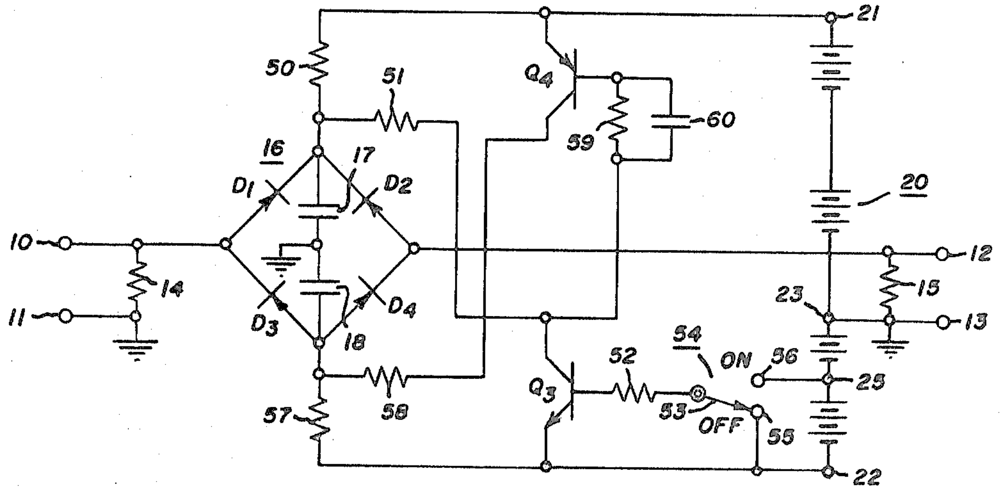
FIG. 3 is a schematic diagram of another embodiment of the switching circuit of my invention.

FIG. 3 shows a circuit in which the transistors $Q_3$ and $Q_4$ in the control circuit are conductive when the diodes are conductive and vice versa. Such an arrangement economizes on the use of electrical power. In this FIG., the elements corresponding to the elements of FIG. 1 are similarly designated. The utilization circuit of FIG. 1 is the same as FIG. 3 and includes a pair of input terminals 10 and 11 across which is connected a load resistor 14, and a pair of output terminals 12 and 13, across which is also connected another load resistor 15. Terminals 11 and 13 are connected to ground. The ground terminals are connected to the intermediate point 23 on the unidirectional voltage source 20 and the bridge circuit 16 consisting of diodes $D_1$, $D_2$, $D_3$, and $D_4$ is connected in the line between input terminal 10 and output terminal 12. In addition, a pair of capacitors 17 and 18 are connected in series between the common cathodes and common anodes of the diodes $D_1$, $D_2$, $D_3$, and $D_4$, with the common terminal of capacitors 17 and 18 connected to ground, to provide further isolation of the input terminals 10 and 11 from the output terminals 12 and 13 when diodes $D_1$, $D_2$, $D_3$, and $D_4$ are nonconducting. Capacitors 17 and 18 lower the high frequency shunting impedance across input terminals 10 and 11 when the diodes $D_1$, $D_2$, $D_3$, and $D_4$ are nonconductive thereby improving high frequency isolation.

The cathodes of diodes $D_1$ and $D_2$ are connected through a voltage dropping resistor 50 to the positive potential point 21 and also through a resistor 51 to the collector of NPN transistor $Q_3$. The emitter of transistor $Q_3$ is connected to the negative potential point 22. The base of the transistor $Q_3$ is connected through a current limiting resistor 52 to the pole 53 of a single-pole double-throw switch 54, one contact 55 of which, designated the "OFF" contact, is connected to the negative potential point 22. The other contact 56 of switch 54, designated the "ON" contact, is connected to the intermediate potential point 25. The anodes of diodes $D_3$ and $D_4$ are connected through a voltage dividing resistor 57 to the negative potential point 22 and also connected through a resistor 58 to the collector of PNP transistor $Q_4$, the emitter of which is connected to the positive potential point 21. The base of the transistor $Q_4$ is connected through a biasing network comprising a resistor 59 shunted by a capacitor 60 to the collector of $Q_3$.

With switch 54 in the "OFF" position, the base of transistor $Q_3$ is connected to the same potential point as the emitter so that the transistor $Q_3$ is biased nonconductive. Accordingly, the cathodes of diodes of $D_1$ and $D_2$ are connected through the resistor 50 to the positive potential point and hence biased nonconductive. The base of the transistor $Q_4$ is also connected through resistors 59, 51 and 50 to the positive point 21 to which the emitter thereof is also connected and, hence, transistor $Q_4$ is also biased nonconductive. Accordingly, diodes $D_3$ and $D_4$ are nonconductive as the anodes of diodes $D_3$ and $D_4$ are at the potential of point 21. Thus, the input terminals 10 and 11 are isolated from the output terminals 12 and 13.

Figure 4:
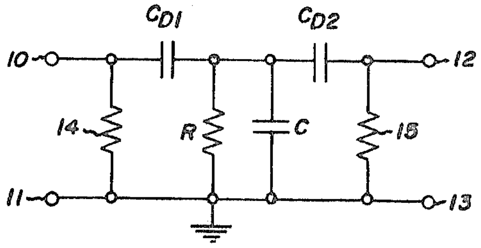
FIG. 4 is an equivalent circuit of one-half of the diode bridge circuit of FIG. 3 useful in explaining the operation thereof.

FIG. 4 is an equivalent circuit of a portion of the schematic circuit of FIG. 3 showing the impedance presented between the input terminal 10 and the output terminal 12 when the diodes $D_1$ and $D_2$ are reversely biased. Elements of FIG. 4 identical with elements of FIG. 3 are designated by the same reference symbol. The element $C_{D1}$ is the capacitance of the reversely biased diode $D_1$ and the element $C_{D2}$ is the capacitance of the reversely biased diode $D_2$. R represents the resistive impedance to ground in the collector circuit of transistor $Q_3$ when nonconductive, i.e. resistor 50 of FIG. 3. $C$ represents the capacitance of capacitor 17 and provides an impedance path in shunt with resistance $R$. The impedance of the parallel combination of $R$ and $C$ is low in comparison to impedance of $C_{D1}$ of reversely biased diode $D_1$. Thus, a very small portion of the signal appearing across input terminals 10 and 11 appears across the parallel combination of resistor R and capacitor C. Such signal is further attenuated at the output terminals by the series combination of the capacitance $C_{D2}$ of the reversely biased diode $D_2$ in series with the output resistor 15.

To actuate the control circuit, that is to connect the input terminal 10 to the output terminal 12, the pole of the switch is moved to engage the "ON" contact 56. Such action drives the NPN transistor $Q_3$ into conduction and essentially provides a voltage divider network comprising resistors 50 and 51 and the saturation resistance of the transistor $Q_3$ in series across the source 20. The resistances of the divider network are proportioned such that the potential at the junction of resistors 50 and 51 is negative with respect to ground. Accordingly, the diodes $D_1$ and $D_2$ become forwardly biased and conduct. Lowering the potential of the collector of $Q_3$ lowers the potential of the base of the PNP transistor $Q_4$, thereby driving transistor $Q_4$ into conduction and resulting in saturation current flowing from the emitter to the collector thereof. In effect, the saturation resistance of $Q_4$ and the resistors 57 and 58 are connected in series across the positive and negative potential points 21 and 22 of the source 20. The resistors of such series network are selected so that the potential at the junction of resistors 57 and 58 is positive with respect to ground. Accordingly, diodes $D_3$ and $D_4$ are forwardly biased and conduct. With the diodes of the bridge network conductive, current flows from the positive potential point 21 through the collector circuit of $Q_4$ and through the resistor 58, and then divides through diodes $D_3$ and $D_4$. The portion of the current through $D_3$ flows through input resistor 14 to ground. The portion of the current that flows through $D_4$ passes through the output resistor 15 to ground. Similarly, current flows in the opposite direction from ground through the input resistor 14, through diode $D_1$ and combined with current that flows from ground through output resistor 15 and diode $D_2$. The combined current flows through resistor 51 and through the collector-emitter circuit of $Q_3$ to the negative potential point 22. The parameters of the circuit are arranged so that the currents that flow through the input resistor 14 and the output resistor 15 are balanced; that is, the current flowing in one direction is balanced to nullify the current flowing in the opposite direction through each of resistors 14 and 15.

While the invention has been described in specific embodiments, it will be appreciated that many modifications may be made by those skilled in the art, and I intend by the appended claims to cover all such modifications and changes as fall within the true spirit and scope of the invention.

I claim:

1. A switching circuit comprising:
an input terminal;
an output terminal;
a first resistor connected between said input terminal and ground;
a second resistor connected between said output terminal and ground;
first and second pairs of unilaterally conducting devices, each of said devices having an anode and a cathode and displaying an impedance of low value when conducting and an impedance of high value when non conducting, the devices in one of said pairs being connected in series with the cathodes thereof joined at a first common terminal between said input and said output terminals and the devices in the other of said pairs being connected in series with the anodes thereof joined at a second common terminal between said input and said output terminals;
a source of potential having a positive and a negative potential point, and an intermediate potential point connected to ground;
a first circuit including a fixed impedance element and a first controllable impedance element connected in series across said positive and negative points with the junction thereof connected to the cathodes of said one pair of unilaterally conducting devices;
a second circuit including a fixed impedance element and a second controllable impedance element connected in series across said positive and negative points with the junction thereof connected to the anodes of said other pair of unilaterally conducting devices; and
means for conjointly increasing or decreasing the impedances of said first and second variable impedance elements to increase or decrease, respectively, the values of impedance of each of said unilaterally conducting devices.

2. The switching circuit of claim 1 including first capacitance means coupling said first common terminal to ground, and second capacitance means coupling said second common terminal to ground.

3. The switching circuit of claim 1 including means coupling a control potential to a control electrode of said first controllable impedance element, and means coupling the output of said first controllable impedance element to a control electrode of said second controllable impedance element.

4. The switching circuit of claim 3 including first capacitance means coupling said first common terminal to ground, and second capacitance means coupling said second common terminal to ground.

5. A switching circuit comprising:
an input terminal;
an output terminal;
a first resistor connected between said input terminal and ground;
a second resistor connected between said output terminal and ground;
first and second pairs of diodes, each of said diodes having an anode and a cathode, the diodes in one of said pairs being connected in series with the cathodes thereof joined at a first common terminal between said input and said output terminals and the diodes in the other of said pairs being connected in series with the anodes thereof joined at a second common terminal between said input and said output terminals;
a source of potential having a positive and a negative potential point, and an intermediate potential point connected to ground;
a first circuit including a first transistor and a first resistor connected in series with the emitter and collector electrodes of said first transistor between said positive and negative potential points, the collector electrode of said first transistor being connected to the common cathodes of one of said pairs of diodes;
a second circuit including a second transistor and a second resistor connected in series with the emitter and collector electrodes of said second transistor between said positive and negative potential points, the collector electrode of said second transistor being connected to the common anodes of the other of said pairs of diodes;
means coupling the collector electrode of said first transistor to the base electrode of said second transistor; and
means selectively coupling a control potential to the base electrode of said first transistor, said control potential at one amplitude level producing conduction in said first transistor so as to bias said diodes nonconductive and, at another amplitude level, rendering said first transistor nonconductive so as to bias said diodes conductive to establish a conductive path between said input terminal and said output terminal.

6. The switching circuit of claim 5 including first capacitance means coupling said first common terminal to ground, and second capacitance means coupling said second common terminal to ground.